Patented Apr. 11, 1939

2,154,272

UNITED STATES PATENT OFFICE 2,154,272

METHOD FOR PRODUCING ACYL DERIVATIVES OF THE DIHYDROFOLLICLE HORMONE AND RESULTING PRODUCT

Friedrich Hildebrandt, Hohen Neuendorf, near Berlin, Germany, and Erwin Schwenk, Bloomfield, N. J., assignors to Schering Aktiengesellschaft, Berlin, Germany, a corporation of Germany No Drawing. Application February 6, 1936, Serial No. 62,630

19 Claims. (Cl. 260—397)

This invention relates to a method for producing acyl derivatives of the dihydrofollicle hormone.

This application is a continuation-in-part of our application Ser. No. 694,687, filed October 21, 1933, Patent No. 2,039,414, dated May 5, 1936, entitled "Method of producing follicle hormone hydrates", and application Ser. No. 703,602, filed December 22, 1933, Patent No. 2,033,487, dated March 10, 1936, entitled "Acyl derivatives of the dihydrofollicle hormone and method of making the same".

In said latter application, there was described a method wherein an acylating agent was caused to act upon the dihydrofollicle hormone in the presence of suitable solvents, whereby there was formed mono and di-esters of said hormone. In the earlier of said applications, we had described a process wherein an acylating agent was caused to react upon the dihydrofollicle hormone in the presence of certain acid catalysts. The products resulting from this reaction have been found to be mono and di-acyl derivatives of said hormone.

Specifically, in accordance with the present invention, acylation may take place by the use of the free organic acids usually in the anhydrous state. Said agents are mixed with the dihydrofollicle hormone in the presence of certain strong acids, such as hydrohalogen acids, for instance, hydrobromic and hydriodic; sulphonic acids such as benzene or toluene sulphonic acid, or the like.

Thereby besides diacyl compounds and other by-products monoacyl compounds of dihydrofollicle hormone are obtained having the following structural formula

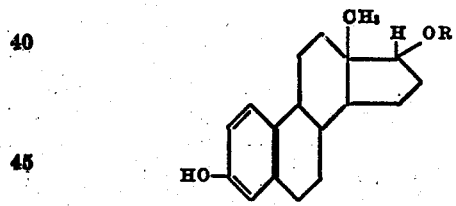

wherein R represents an acyl group.

The following example illustrates the invention:—

1 gram of dihydrofollicle hormone of the melting point 172°–173° C., obtained as described in our copending application Ser. No. 694,686, filed Oct. 21, 1933, and having the following structural formula

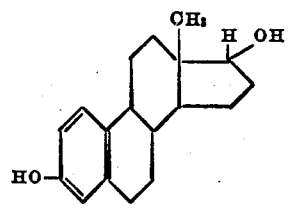

is dissolved in as little glacial acetic acid as possible. 100 cc. of a glacial acetic acid-hydrobromic acid mixture (3:2) are added to this solution while cooling with ice. The reaction mixture first becomes golden-yellowish and then gradually somewhat deeper in shade. After allowing the solution to stand for two days, whereby it becomes entirely clear and free from crystals, it is poured into about 500 cc. of ice water, while cooling by means of ice. Thereby a white flocculent precipitate is obtained which is dissolved in ether. The etheral solution is then shaken successively with 5% aqueous sodium carbonate solution and with water, is dried and the ether is evaporated. The remaining oily residue exhibits a clear golden-yellow color and fluorescence on testing its solution in concentrated sulphuric acid by means of an ultra-violet lamp (quartz lamp) in contrast to the starting material which fluoresces bright blue in such a solution.

This product is purified by fractionated crystallization from aqueous methanol, in which operation if necessary it is treated with active carbon or the like. It then exhibits in concentrated sulphuric acid a light-green fluorescence which changes gradually to a bluish shade. Two well defined crystalline products of the melting points 120°–121.5° C. and 210° to 213° C. can be isolated from the purified product which shows a blue fluorescence.

The compound with the melting point 120°–121.5° C. crystallizes in soft, shiny and greasy laminae. It is the diacetate of the dihydrofollicle hormone of melting point 172°–173° C. and having the following structural formula:

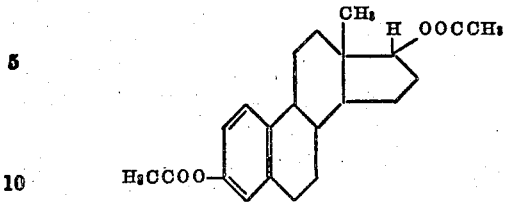

On physiologically assaying it by means of the Allen-Doisy test with castrated mice, it shows an efficiency of 10 million mouse units per gram when applied subcutaneously in aqueous solution, the total dose being administered in the customary manner in six equal portions at definite time intervals.

The second compound which melts at 210°–213° C. crystallizes in the form of granular coarse aggregates of crystals. It is the monoacetate of the dihydrofollicle hormone of melting point 172°–173° C. the alcohol group in the five carbon ring being esterified. It has the following structural formula:

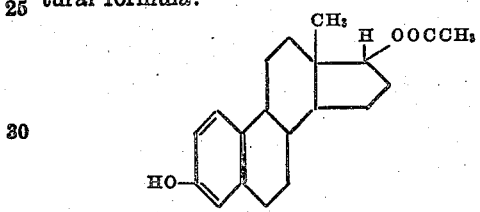

This preparation exhibits when assayed under the same conditions as mentioned above, a considerable physiological effect which amounts on subcutaneous application to 20 million mouse units per gram.

Instead of acetic acid, other acids may be used such as propionic acid, butyric acid, benzoic acid and the like. Hydrobromic acid may be replaced by hydrochloric acid, especially in gaseous form, concentrated sulfuric acid, toluene sulfonic acids, or other acids or even acid salts, such as zinc chloride and the like.

The separation of the esterification products into the mono and the diacyl compounds may be carried out also by means of other methods as described above. For instance, the crude product obtained on evaporating the thereal solution of the reaction products is preciptated from its methanolic solution by addition of water whereupon the crystalline precipitate is carefully lixiviated with hot methanol. Thereby the diacetate is first dissolved while the monoacetate remains undissolved. Both acetates may be further purified by recrystllisation from dilute methanol whereby the diacetate crystallises in shiny needles and the monoacetate in small needles. The former may also be recrystallized from dilute acetone and the latter from acetic acid ethyl ester, thereby forming coarse crystals.

Of course, other changes and variations in the reaction conditions may be made by those skilled in the art in accordance with the principles set forth herein and in the claims annexed hereto.

What we claim is:

1. A method for the production of acyl compounds of dihydrofollicle hormone which comprises treating the dihydrofollicle hormone with acylating agents in the presence of strong acids as catalysts in addition to the said acylating agent, whereby a reaction takes place with the formation of acyl derivatives of said dihydrofollicle hormone.

2. A method for the production of acyl compounds of dihydrofollicle hormone which comprises treating the dihydrofollicle hormone with acylating agents in the presence of strong acids as catalysts in addition to the said acylating agent while maintaining the temperature below room temperature, whereby a reaction takes place with the formation of acyl derivatives of said dihydrofollicle hormone.

3. A method for the production of acyl compounds of dihydrofollicle hormone which comprises treating the dihydrofollicle hormone with acylating agents in the presence of acid catalysts taken from the class consisting of hydrobromic and hydriodic acids, whereby a reaction takes place with the formation of acyl derivatives of said dihydrofollicle hormone.

4. A method for the production of acyl compounds of dihydrofollicle hormone which comprises treating the dihydrofollicle hormone with acylating agents in the presence of strong acids as catalysts in addition to the said acylating agent, allowing the mixture to stand and pouring the same into cold water, whereby acyl derivatives of said dihydrofollicle hormone separate out.

5. A method for the production of acyl compounds of dihydrofollicle hormone which comprises treating the dihydrofollicle hormone with acylating agents in the presence of strong acids as catalysts in addition to the said acylating agent, allowing the mixture to stand and pouring the same into cold water, whereby acyl derivatives of said dihydrofollicle hormone separate out, dissolving said product in a water-immiscible solvent and then evaporating said solvent.

6. A method for the production of acyl compounds of dihydrofollicle hormone which comprises treating the dihydrofollicle hormone with acylating agents in the presence of strong acids as catalysts in addition to the said acylating agent, allowing the mixture to stand and pouring the same into cold water, whereby acyl derivatives of said dihydrofollicle hormone separate out, dissolving said product in ether and then evaporating the ether.

7. A method for the production of acyl compounds of dihydrofollicle hormone which comprises treating the dihydrofollicle hormone with glacial acetic acid in the presence of strong acids as catalysts in addition to the said acylating agent, whereby a reaction takes place with the formation of acyl derivatives of said dihydrofollicle hormone.

8. A method for the production of acyl compounds of dihydrofollicle hormone which comprises treating the dihydrofollicle hormone with glacial acetic acid in the presence of acid catalysts taken from the class consisting of hydrobromic and hydriodic acids, whereby a reaction takes place with the formation of acyl derivatives of said dihydrofollicle hormone.

9. The acetic acid esters of the dihydrofollicle hormone having the following structural formula:

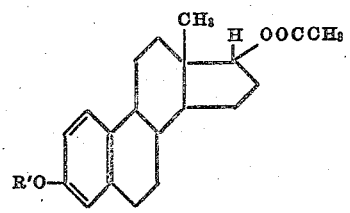

wherein R' is an acetyl group or H.

10. The monoacetic acid ester of the dihydrofollicle hormone having the following structural formula:

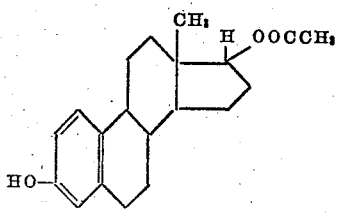

having a melting point of 210°–213° C. and showing a blue fluorescence in concentrated sulphuric acid.

11. The diacetic acid ester of the dihydrofollicle hormone having the following structural formula:

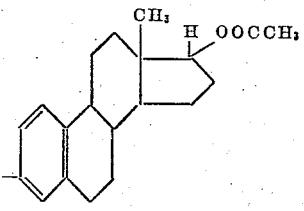

having a melting point of 120°–121.5° C. and showing a blue fluorescence in concentrated sulphuric acid.

12. Acyl compounds of the dihydrofollicle hormone having the following structural formula

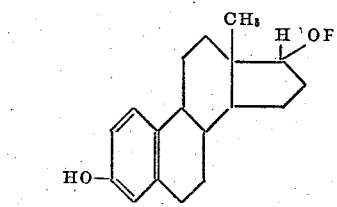

wherein R is an acyl group.

13. Compounds according to claim 12, in which R is an acyl group containing more than two carbon atoms.

14. A method for the production of acyl compounds of dihydrofollicle hormone which comprises treating the dihydrofollicle hormone with free organic acids as acylating agents in the presence of acid catalysts in addition to said acylating agents, said catalysts being substantially anhydrous and of sufficient acidity to promote the acylation, whereby a reaction takes place with the formation of acyl derivatives of said dihydrofollicle hormone.

15. A method for the production of acyl compounds of dihydrofollicle hormone which comprises treating the dihydrofollicle hormone with free organic acids as acylating agents in the presence of acid catalysts in addition to said acylating agents, said catalysts being substantially anhydrous and of sufficient acidity to promote the acylation, whereby a reaction takes place with the formation of acyl derivatives of said dihydrofollicle hormone, the acyl group being first introduced into the 17 position.

16. A method for the production of acyl compounds of dihydrofollicle hormone which comprises treating the dihydrofollicle hormone with free organic acids in the anhydrous state as acylating agents in the presence of acid catalysts in addition to said acylating agents, said catalysts being substantially anhydrous and of sufficient acidity to promote the acylation, whereby a reaction takes place with the formation of acyl derivatives of said dihydrofollicle hormone.

17. A method for the production of acyl compounds of dihydrofollicle hormone which comprises treating the dihydrofollicle hormone with acylating agents in the presence of acid catalysts taken from the class consisting of aromatic sulphonic acids, whereby a reaction takes place with the formation of acyl derivatives of said dihydrofollicle hormone.

18. A method for the production of acyl compounds of dihydrofollicle hormone which comprises treating the dihydrofollicle hormone with glacial acetic acid in the presence of acid catalysts taken from the class consisting of aromatic sulphonic acids, whereby a reaction takes place with the formation of acyl derivatives of said dihydrofollicle hormone.

19. The monopropionic acid ester of the dihydrofollicle hormone having the following structural formula

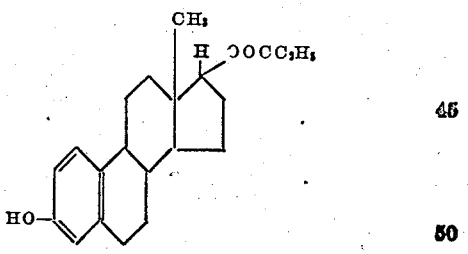

FRIEDRICH HILDEBRANDT.
ERWIN SCHWENK.